US008972434B2

(12) United States Patent  
English et al.

(10) Patent No.: US 8,972,434 B2
(45) Date of Patent: Mar. 3, 2015

(54) MULTI-PHASE SEARCH AND PRESENTATION FOR VERTICAL SEARCH WEBSITES

(75) Inventors: Paul M. English, Norwalk, CT (US); Travis M. Gebhardt, Norwalk, CT (US); Kristin P. Harkness, Norwalk, CT (US); Lincoln D. Jackson, Norwalk, CT (US); Jeffrey A. Rago, Norwalk, CT (US); Paul D. Schwenk, Norwalk, CT (US); Brenda L. White, Norwalk, CT (US)

(73) Assignee: Kayak Software Corporation, Norwalk, CT (US)

( * ) Notice: Subject to any disclaimer, the term of this patent is extended or adjusted under 35 U.S.C. 154(b) by 541 days.

(21) Appl. No.: 11/951,098

(22) Filed: Dec. 5, 2007

(65) Prior Publication Data

US 2009/0150343 A1 Jun. 11, 2009

(51) Int. Cl.
*G06F 17/30* (2006.01)
*G06F 7/00* (2006.01)
*G06Q 30/06* (2012.01)
*G06Q 50/14* (2012.01)

(52) U.S. Cl.
CPC ............ *G06Q 30/0603* (2013.01); *G06Q 50/14* (2013.01)
USPC ............................ 707/765; 707/706; 707/709

(58) Field of Classification Search
None
See application file for complete search history.

(56) References Cited

U.S. PATENT DOCUMENTS

| | | | | |
|---|---|---|---|---|
| 2004/0054690 | A1* | 3/2004 | Hillerbrand et al. | 707/104.1 |
| 2005/0033616 | A1* | 2/2005 | Vavul et al. | 705/5 |
| 2005/0262065 | A1* | 11/2005 | Barth et al. | 707/3 |
| 2006/0020591 | A1* | 1/2006 | Kommers et al. | 707/3 |
| 2006/0161568 | A1* | 7/2006 | Dettinger et al. | 707/101 |
| 2006/0190308 | A1* | 8/2006 | Janssens et al. | 705/5 |
| 2006/0200807 | A1* | 9/2006 | Bates et al. | 717/129 |
| 2006/0206363 | A1* | 9/2006 | Gove | 705/6 |
| 2007/0078815 | A1* | 4/2007 | Weng et al. | 707/2 |
| 2007/0192300 | A1 | 8/2007 | Reuther et al. | |
| 2008/0270250 | A1* | 10/2008 | Bolivar et al. | 705/26 |
| 2008/0306910 | A1* | 12/2008 | Singh | 707/3 |

OTHER PUBLICATIONS

PCT International Search Report and Written Opinion, PCT Application No. PCT/US08/84733, Jan. 16, 2009, 10 pages.

* cited by examiner

*Primary Examiner* — Dung K Chau
(74) *Attorney, Agent, or Firm* — Wolf, Greenfield & Sacks, P.C.

(57) ABSTRACT

The present invention provides a methodology and system for efficiently performing travel reservation queries and presenting significant search results to a user. A travel reservation search engine constructs a first query from one or more constraints. The first query has a threshold probability of returning a first set of search results that will lead to the purchase of a travel reservation. Additionally, if determined necessary by the search engine a second query is constructed from one or more constraints. The second query returns a second set of search results.

35 Claims, 6 Drawing Sheets

MULTI-PHASE SEARCH AND PRESENTATION FOR VERTICAL SEARCH WEBSITES

BACKGROUND OF THE INVENTION

1. Field of the Invention

This invention pertains in general to multi-phase search and presentation for vertical search websites, and in particular to multi-phase search for travel reservation vertical search websites.

2. Description of the Related Art

Hundreds of travel related websites enable users to make different types of travel reservations, such as hotel, flight, car rental, etc. via the Internet. These travel related websites are one example of a vertical search engine. These vertical search engines query multiple websites, search engines, and other sources for specific travel reservation information as requested by a user. The vertical search engine then returns to the user integrated search results from all of the different sources queried. Vertical search engines are convenient for users because they eliminate the labor of going to multiple websites, performing a search at each website, and comparing results.

Depending on the search, vertical search engines for travel reservations typically take a long time to return search results to a user. This results from the fact that there are both massive datasets that must be queried and there are a very large number of potentially satisfactory search results. In addition, often multiple searches must be performed on multiple different underlying travel systems. These multiple underlying queries are generally performed in parallel and the results are not presented to the client until all of the underlying queries are complete. In an effort to present search results to a client sooner, some vertical search engines present search results as different underlying searches of individual sources are complete. This method of displaying search results can be frustrating to the user because the list of search results is continuously changing.

Another problem with vertical search engines is that because multiple underlying queries are performed, a large number of search results are returned and presented to the user. Even then, the best results may not be displayed in the user interface, but rather available only after the user accesses several other pages of results, changes the sort order of the search results, or filters the results with additional parameters. All of these additional actions delay the user in finding the results of greatest relevance. As a result, vertical search engines for travel reservations are not able to quickly present significant search results to a user.

BRIEF SUMMARY OF THE INVENTION

The present invention provides a methodology and system for efficiently performing travel reservation queries and quickly presenting significant search results to a user. Travel reservations include reservations for flights, accommodations, transportation (e.g., car rentals) cruises, and any other aspect of a travel experience for which reservations are generally offered. Embodiments of the methodology comprise a travel reservation search engine receiving from the user a search request for travel reservation information. The travel reservation search engine constructs a first query from one or more constraints associated with the search request. For example, for a flight reservation query, possible constraints could be the departure city, arrival city, travel times, number of stops, and the like. The first query has a threshold probability of returning successful search results. A successful search results is one that leads to an appropriate user action based upon the result, such as a purchase of a travel reservation based upon the result, an inquiry to a travel vendor based upon the result, a reservation based upon the results, and the like. The first query is executed on one or more travel reservation sources and a set of first phase query results are received by the search engine. The search engine presents the first phase query results to the user.

Additionally, if determined necessary by the search engine a second query is constructed from one or more constraints associated with the search request. The second search query when executed on one or more travel reservation sources returns a set of secondary phase query results. A summary is determined for the secondary phase query results and presented to the user. If the user selects to view the secondary phase query results, the secondary phase query results are presented to the user.

The features and advantages described in this summary and the following detailed description are not all-inclusive. Many additional features and advantages will be apparent to one of ordinary skill in the art in view of the drawings, specification, and claims hereof.

The figures depict an embodiment for purposes of illustration only. One skilled in the art will readily recognize from the following description that alternative embodiments of the structures and methods illustrated herein may be employed without departing from the principles described herein.

DETAILED DESCRIPTION

Overview of Multi-Phase Search and Presentation of Search Results

Figure 1A:
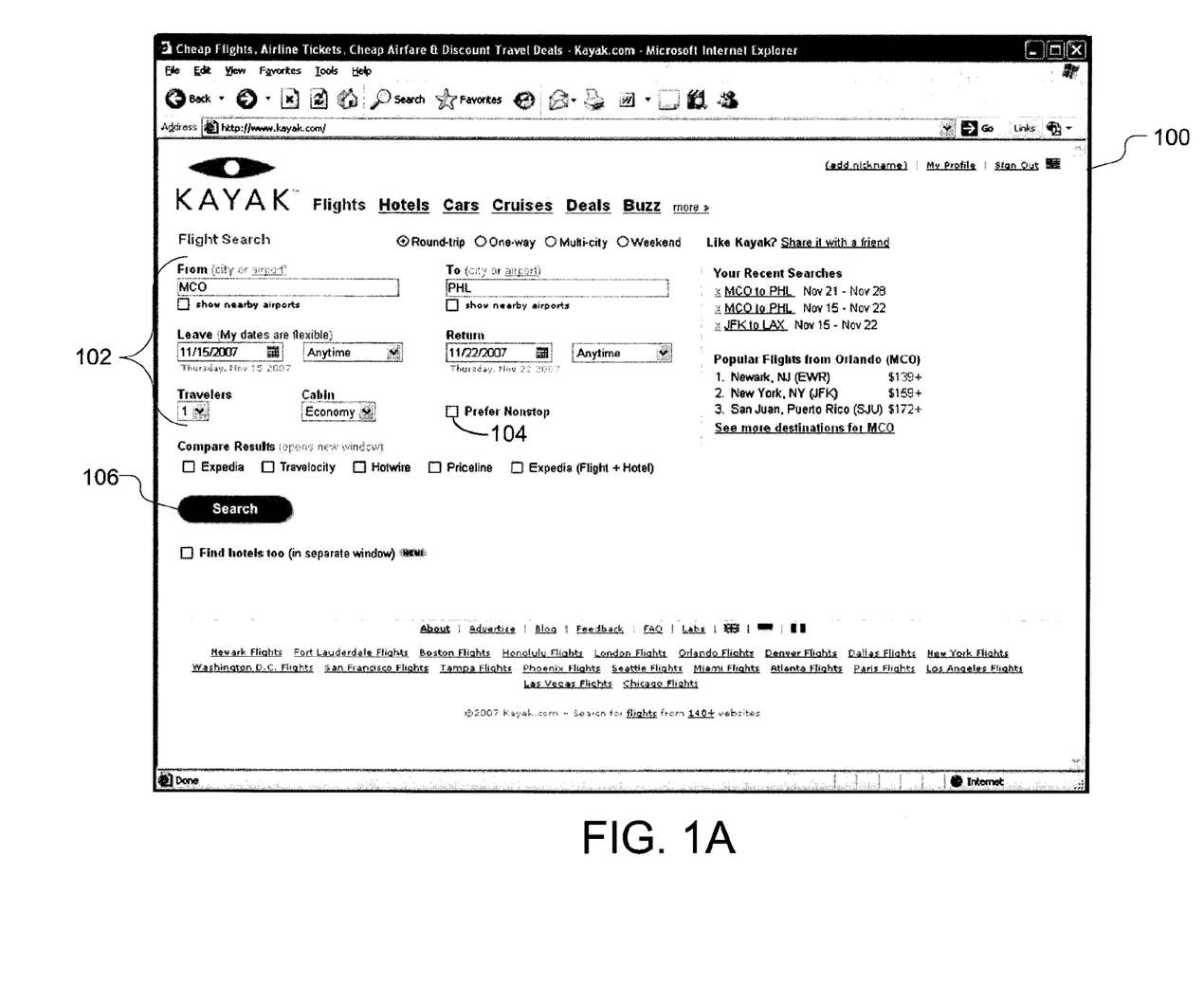
FIGS. 1A, 1B, and 1C are examples of the sequence of a travel reservation search engine performing a multi-phase search for a flight reservation.
Figure 1B:
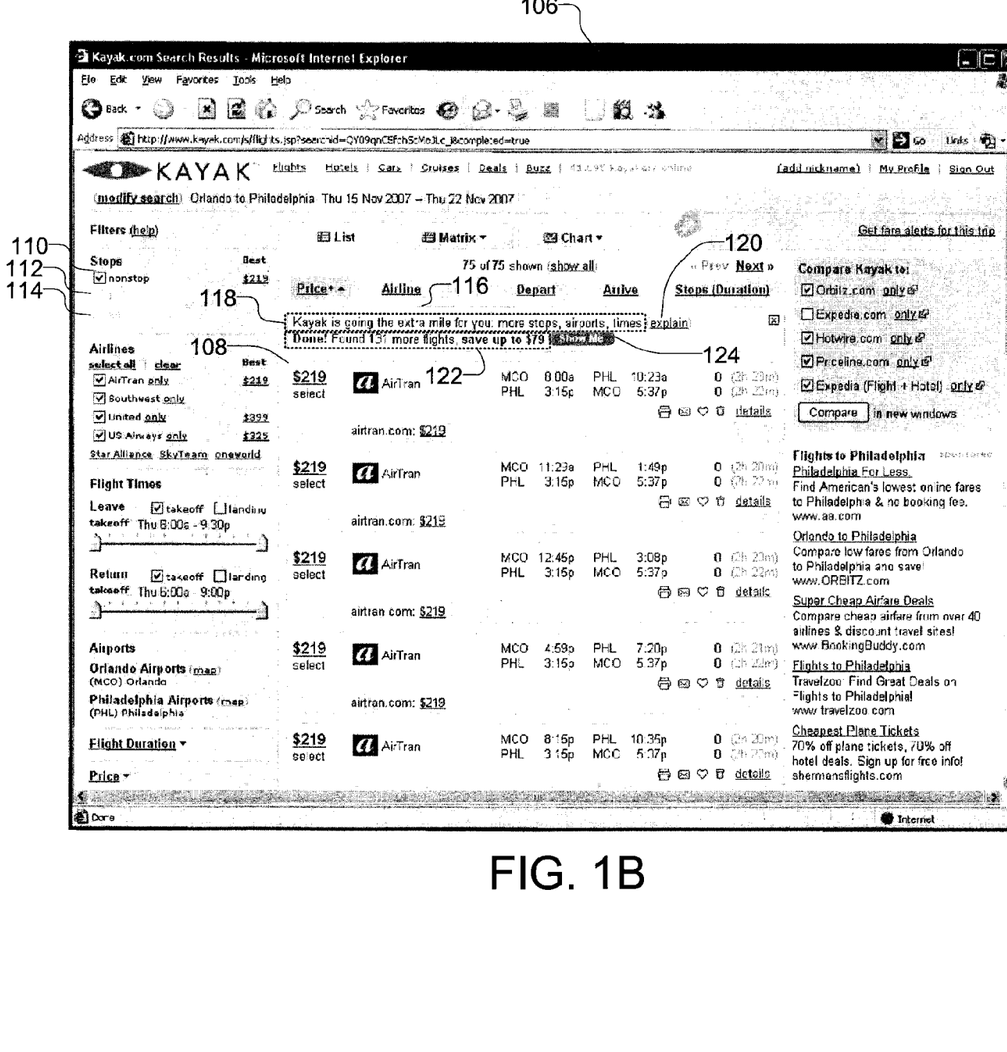
Figure 1C:
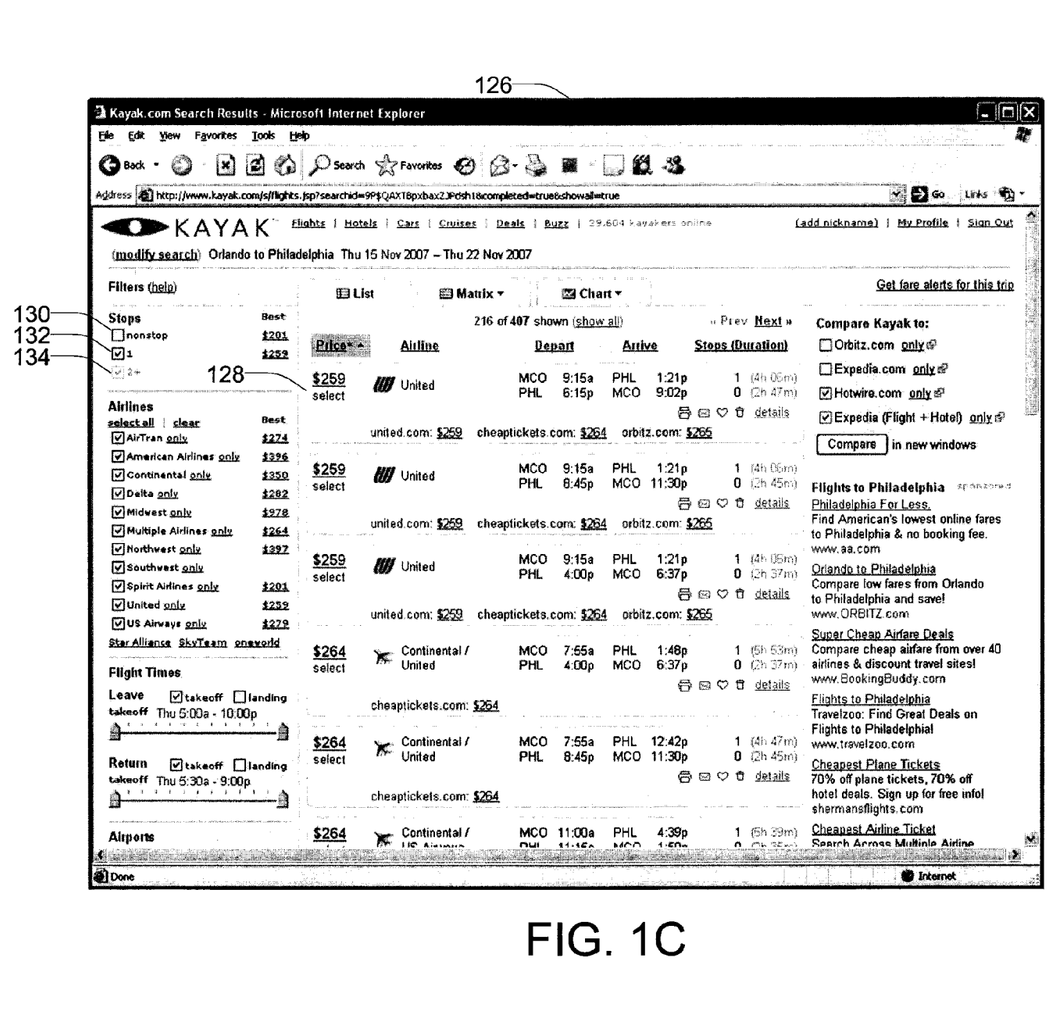

FIGS. 1A, 1B, and 1C are examples of the sequence of a travel reservation search engine performing a multi-phase search for a type of travel reservation, a flight reservation. In this example, beginning in FIG. 1A, through webpage 100 a user enters flight information 102 for a travel arrangement. The flight search information 102 that is entered by the user includes information that will help the search engine find flights that are of interest to the user, such as type of flight, departing city, arrival city, travel times and dates, and the like. Note that the user did not check off the prefer nonstop box 104 when entering the flight search information 102, which means that the user is not constraining the search to only nonstop flights. Once the flight search information is entered by the user, the user presses on a search button 106 in order to submit a search request for flights based on the flight information 102 to the travel reservation search engine. The travel reservation search engine conducts a multi-phase search, including a first search phase and possibly one or more secondary search phases. The purpose of the first search phase is to quickly provide a user with search results that have a threshold probability of leading to a purchase of a travel reservation. This threshold probability is a parameter set by the system operator, and may be referred to as a target result probability. This parameter sets a minimum probability level to be satisfied by a given search query in order for the search query to be considered for the first search phase. In one embodiment, the main purpose of the first search phase is to provide search results to a user as quickly as possible. In one embodiment, secondary search phases, if executed, have search results with a lower probability than the search results of the first search phase of leading to a purchase of a travel reservation. In another embodiment, the second search phase is more thorough than the first search phase, meaning that the search results of the first search phase have a lower probability than the search results of the second search phase of leading to the purchase of a travel reservation. In other words, the system tries to identify a narrower (i.e. more constrained) first search phase that is likely to return results faster and is reasonably likely to contain the result the user was searching for. Subsequent search phases will return the complete results.

For each search phase, the travel reservation search engine constructs a search query based on constraints associated with the flight information, and provides the search query to one or more underlying travel information systems. The systems provide search results, which are manipulated by the travel reservation search engine into a set of results for the first search, and a set of results for each secondary search phase.

Webpage 106 in FIG. 1B displays search results 108 presented to the user for the first search phase. In this example, the first search phase results are presented to the user in a matter of a couple seconds. A conventional travel reservation search engine would have taken approximately 30 seconds to receive complete search results. The reduction in time is highly beneficial, and considerably enhances the user's experience, as the user is not left waiting for results, but instead can almost immediately begin to review the results. As can be seen the nonstop check box 110 is marked and neither the one stop check box 112 nor the two or more stop check box 114 are marked. The reason for that is because the travel reservation search engine for the first search phase constrained the search to only look for nonstop flights even though the user did not restrain the search to nonstop flight when submitting the flight information. The search engine constrained the first search phase to only nonstop flight because a high percentage of past users who entered the same flight information as the user purchased nonstop flights, which means that there is a high probability that the user that entered the search information in this instance will also purchase a nonstop flight. An additional factor in constraining the first search phase was the fact that complete search results would be presented to the user in a much shorter amount of time.

In this example, the search engine conducts a second search phase for flights with one or more stops. In this example, the search results for the second search phase will contain results with a lower probability of leading to a purchase of a flight reservation because for flights between the two cities that the user entered fewer users purchase flights with one or more stops. In this example, there are more possible flights with one or more stops, which means that it takes longer for the search engine to receive results for the second search phase. Box 116 displays a first summary 118 letting the user know that a second search phase is being performed by the search engine. Upon selection, link 120 displays a window that includes an explanation to the user that explains why the user's search request is being conducted in multiple phases. It is important that the user understand the distinction between a first search phase and any of the one or more secondary search phases in order for the user not to become confused. Any type of visual highlighting can be used to help the user understand that their search request is being executed in multiple phases.

Once the second search phase is complete, the second search phase results are not immediately presented to the user. If secondary search results were immediately presented to the user at the completion of a secondary search phase it would create a very confusing user experience because as the user is looking at one result, the secondary results would be presented, which would cause the first search phase results to be rearranged. Additionally, the user will not know how long to wait before acting on the results.

Accordingly, instead of immediately presenting the second search phase results, box 116 displays a second summary 122. The purpose of the second summary 122 is to highlight special characteristics of the second search phase results. The second summary 122 assists the user in deciding whether it will be beneficial to the user to view the second search phase results. In this example the second summary 122 notifies the user that the second search phase results contain flights that could save the user up to $79, alternatively the second summary 122 could have displayed that the second search phase contained results with one or more stops. It should be understood that a summary for search results is not limited to only highlighting potential savings or the constraints of the results, the summary can highlight any of the characteristics of a set of search results, such as shorter flights, flights with more convenient flight times, flights with more reliable airlines, etc. In one embodiment, the summary for the second search phase is determined based on how the user arranges the first search phase results, meaning that if the user arranges the first search phase results based on price the summary for the second search phase results will be based on price difference like the second summary 122 on webpage 106. If the user wishes to view the second search phase results, the user selects button 124.

Webpage 126 in FIG. 1C displays the second search phase results 128 presented to the user. As can be seen the one stop check box 132 and the two or more stop check box 134 are marked because the second search phase query executed was for flights with one or more stops. The two or more stop check box 134 however is not highlighted meaning that no flights were found with two or more stops. The search results for the first search phase and the second phase can be displayed together, as a single integrated search result. If a given result item (e.g. a flight) appears in both the first and second search result, it is only displayed once. In this example, the travel reservation search engine conducted two search phases, it should be understood that the search engine may execute one or more search phases for a specific search request from a user.

Overview of System Environment

Figure 2:
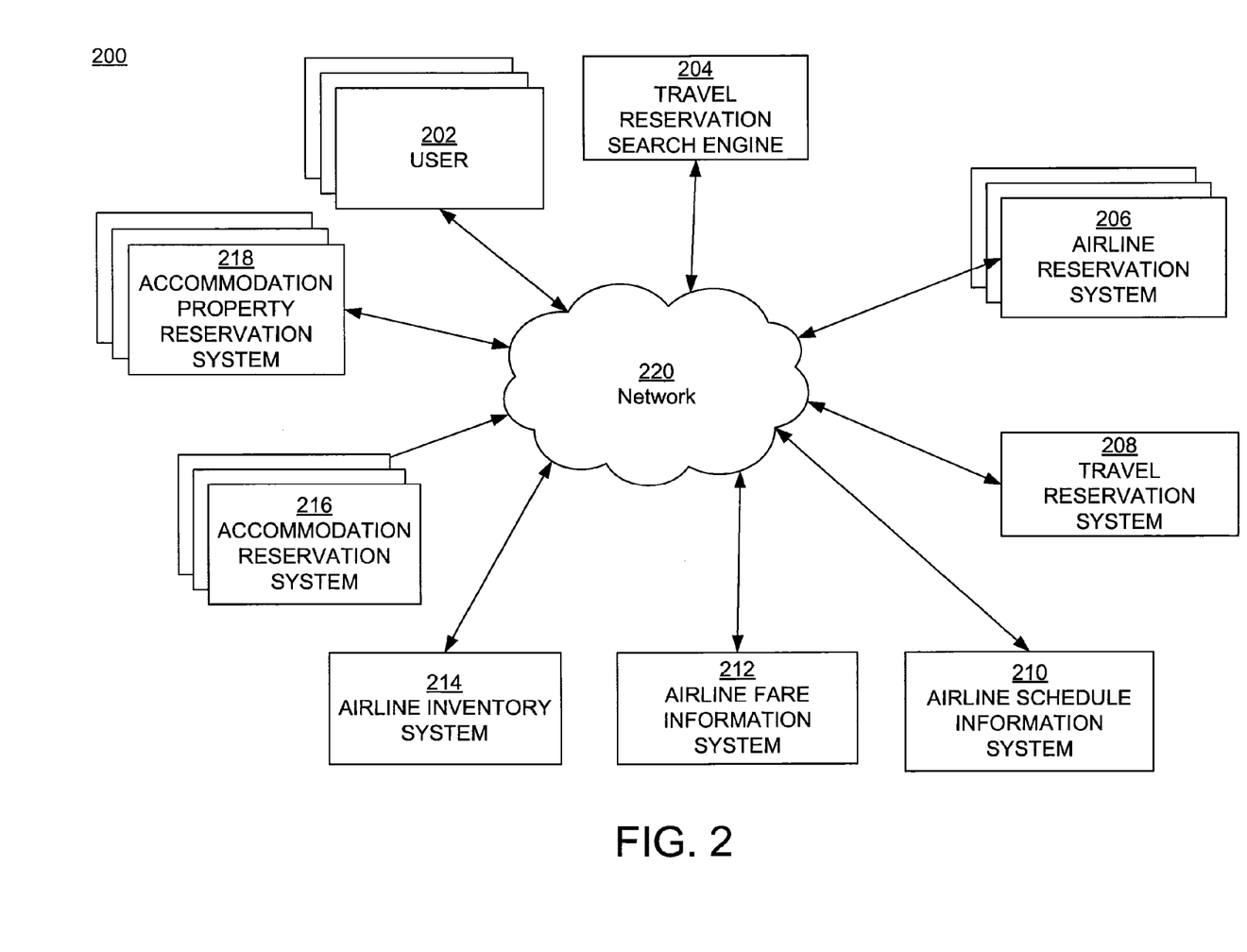
FIG. 2 is a high-level block diagram illustrating a travel reservation search environment.

FIG. 2 is a high-level block diagram illustrating a travel reservation search environment. FIG. 2 illustrates a user 202, a travel reservation search engine 204, an airline reservation system 206, a travel reservations system 208, an airline schedule information system 210, an airline fare information system 212, an airline invention system 214, an accommodation reservations system 216, and an accommodation property reservations system 218 connected by a network 220. It should be understood that other information systems or sources with travel reservation information can be connected to network 220. As used herein, the individual systems in FIG. 2 will be referred to as single systems, but it should be understood that a plurality of the same type of systems can be connected to the network 220.

The user 202 represents an entity that submits travel reservation information requests to the travel reservation search engine 204 and receives travel reservation information from the search engine 204. In one embodiment, the travel reservation information received by the user is received in different phases. The travel reservation information can be any type of travel information, such as on flights, hotels, car rentals, cruises, etc. The travel reservation information requests submitted by the user are usually referred to as "search requests" or "query requests". The user uses the travel reservation search engine 204 to obtain travel reservation information from a variety of sources. Usually, the user requests travel information from the search engine 204 because the user is interested in purchasing a travel reservation; for this reason the user is sometimes referred to as a "traveler", "buyer", or "purchaser."

In one embodiment, the user utilizes a computer system to communicate with the search engine 204 and other systems on the network 220 in order to obtain travel reservation information. The computer system, for example, can be a personal computer executing a web browser such as MICROSOFT INTERNET EXPLORER that allows the end-user to retrieve and display content from web servers and other computer systems on the network 220. In other embodiments, the user utilizes a network-capable device other than a computer system, such as a personal digital assistant (PDA), a cellular telephone, a pager, a television "set-top box", etc. The user's computer system may also be referred to as a "client" of the travel reservation search engine 204.

The travel reservation search engine 204 represents a system that allows the user to obtain travel reservation information from a plurality of systems and sources. In one embodiment, the travel reservation search engine 204 is a vertical search engine that queries multiple systems and/or sources. In one embodiment, the travel reservation search engine 204 uses a type of markup language, such as hypertext markup language (HTML) or extensible markup language (XML) to query multiple systems and/or sources. The search engine 204, for example helps a user find flights that satisfy all of the user's requirements, such as price, number of stops, flight times, etc. In one embodiment, the search engine 204 is provided by KAYAK SOFTWARE CORPORATION of Norwalk, Conn. If a user finds a travel reservation that the user would like to purchase based on the search results provided by the search engine 204, the search engine 204 refers the user to a system or vendor that will allow the user to purchase the travel reservation. In one embodiment, the system or vendor is an online travel agent. Alternatively, the user provides payment information to the search engine 204 in order to purchase a travel reservation.

The airline reservation system 206 is a system that contains airline reservation information for one or more specific airlines. In one embodiment, the airline reservation system contains information for a large number of scheduled flights in terms of schedule, pricing, and inventory. The search engine 204 queries the airline reservation system 206, if the user has requested airline reservation information and it is determined by the search engine 204 that the airline reservation system should be queried. In one embodiment, the purchase of an airline reservation can be made through the airline reservation system 206. An example of an airline reservation system 206 is SABRE™.

The travel reservation system 208 is a system that contains travel reservation information and additionally allows a user to purchase travel reservations. In one embodiment, the travel reservation system 208 is an internet based travel agency. The travel reservation system 208 can enable users to purchase different types of travel reservations, such as flights, hotels, cruises, car rentals, etc. Alternatively the travel reservation system 208 can enable users to purchase a specific type of travel reservation, such as only flights. In one embodiment, the travel reservation system 208 queries a plurality of airline reservation systems 206 and other systems for travel reservation information. In one embodiment, the search engine 204 queries the travel reservation system 208 for travel reservation information. If a user determines to purchase a travel reservation based on information provided by the search engine 204, the search engine 204 provides a link for a specific travel reservation that direct the user to the travel reservation system 208, where the user can purchase the travel reservation selected.

The airline schedule information system 210 is a system that contains airline schedule information for one or more airlines. In one embodiment, the airline schedule information system 210 contains schedule information for all scheduled flights of a plurality of airlines. An example of the schedule information contained by the airline schedule information system 210 for each flight is departure city, departure date, departure time, arrival city, arrival date, arrival time, etc. In one embodiment, the airline schedule information system 210 is the OFFICIAL AIRLINE GUIDE (OAG). In one embodiment, the travel reservations system 208 and/or the airline reservation system 206 queries the airline schedule information system 210 to build their own database. In one embodiment, the search engine 204 queries the airline schedule information system 208 directly to obtain flight schedule information. In one embodiment, the airline schedule information system 210 contains fare information for different types of travel reservations.

The airline fare information system 212 is a system that contains airline fare information for one or more airlines. In one embodiment, the airline fare information system 212 contains fare information for all scheduled flights of a plurality of airlines. In one embodiment, the airline fare information system 212 is the AIRLINE TARIFF PUBLISHING COMPANY (ATPCO) of Dulles, Va. The airline reservation system 206 and/or the travel reservation system query the airline fare information system 208 to build their own databases. Alternatively, the search engine 204 queries the airline schedule fare system 212 directly to obtain flight fare information. In one embodiment, the airline fare information system 212 contains fare information for different types of travel reservations.

The airline inventory system 214 is a system that contains airline inventory information for one or more airlines. In one embodiment, the airline inventory system 214 contains inventory information for all scheduled flights of a plurality of airlines. In one embodiment, the airline inventory system 214 is AMADEUS of Madrid, Spain. The airline reservation system 206 and/or the travel reservation system query the airline inventory system 214 to build their own databases. Alternatively, the search engine 204 queries the airline information system 214 directly to obtain flight fare information. In one embodiment, the airline inventory system 214 contains inventory information for different types of travel reservations.

The accommodation reservation system 216 is a system that contains accommodation reservation information in terms of price and availability. An accommodation reservation system 216 could be for accommodations for a specific chain of hotels, motels, cruises, etc. The search engine 204 and/or the travel reservation system 208 query the accommodation reservation system 216. In one embodiment, the accommodation reservation system 216 obtains accommodation reservation information from other systems and/or sources not shown in FIG. 2.

The accommodation property reservation system 218 is a system that contains accommodation reservation information in terms of price and availability for all different types of properties. An accommodation property reservation system 218 could be for property accommodations for a plurality of hotels, motels, cabins, cruises, etc. The search engine 204 and/or the travel reservation system 208 query the accommodation property system 218. In one embodiment, the accommodation property system 218 obtains property accommodation reservation information from other systems and/or sources not shown in FIG. 2.

The network 220 represents the communication pathways between the user, travel reservation search engine 204, airline reservation system 206, travel reservations system 208, airline schedule information system 210, airline fare information system 212, airline invention system 214, accommodation reservations system 216, and accommodation property reservations system 218 connected by a network 220. In one embodiment, the network 220 is the Internet. The network 220 can also utilize dedicated or private communications links that are not necessarily part of the Internet. In one embodiment, the network 220 uses standard internetworking communications technologies and/or protocols. Thus, the network 220 can include links using technologies such as Ethernet, 802.11, integrated services digital network (ISDN), digital subscriber line (DSL), asynchronous transfer mode (ATM), etc. Similarly, the networking protocols used on the network 220 can include the transmission control protocol/Internet protocol (TCP/IP), the hypertext transport protocol (HTTP), the simple mail transfer protocol (SMTP), the file transfer protocol (FTP), etc. The data exchanged over the network 220 can be represented using technologies and/or formats including the hypertext markup language (HTML), the extensible markup language (XML), etc. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

In one embodiment, the search engine 204 receives a search request from a user. The search engine 204 uses the search request to determine the specific constraints to be used in a search query for a first search phase and if necessary the constraints to be used in a search query for one or more secondary search phases. One or more search phases are executed on any number of the different systems shown in FIG. 2 and/or on additional sources.

Each search phase uses a search query including one or more constraints based on the search request from the user. Herein, a constraint is an attribute or value that can be used in a search query on one of the information and reservation systems. For example, for a flight reservation, constraints include travel times, dates of travel, departure city, arrival city, number of stops, number of passengers, airline, class type, and so forth. Some constraints may be directly taken from the user provided information, whereas others may be derived or inferred there from.

In one embodiment, the specific constraints to be used in a search query for a first search phase and if necessary the constraints to be used in a search query for one or more secondary search phases is determined based on rules. For a given user search request, there will be some number of constraints (or combinations of constraints) that can be used to construct a search query to one or more of the information and reservation systems. Each of these constraints is evaluated to generate a score. In one embodiment, the score is equal to a probability that the search results from a search query using the constraints will include a result that the user is actually seeking and will purchase or otherwise make a travel reservation. In one embodiment, the probability associated with a constraint is determined from historical data (search results and purchase data) of other users with similar search request and/or the personal history of a user that submitted the search request. Constraints which have been determined to have a minimum probability (e.g., 5%) of resulting in purchase from the basis of the rules. In another embodiment, the score is calculated based on a combination of various factors such as the probability of a purchase, the cost of performing a query on different systems, and the simplicity of displaying the search results for the search query.

When the search engine receives a search request, the search engine searches for rules associated to attributes of the specific search request received, for example, rules matching the departing airport, arrival airport, day of travel, and so forth. In one embodiment, from the rules, the search engine selects one or more of the highest scored constraints to associate with the search query for the first search phase, until the cumulative (disjoint) probability reaches a minimum threshold amount, say a 70% probability of resulting in a purchase. The minimum probability threshold is set by the system operator. One or more of the rules with highest scored constraints are chosen for the first search phase because it guarantees the minimum probability that search results for the first search phase will quickly be presented to the user and will result in a purchase/reservation. If determined necessary, the search engine associates one or more rules to each secondary search phase.

In one embodiment, the purpose of the first search phase is to provide search results (with a specific target probability) as quickly as possible, while the purpose of a secondary search phase is to be more thorough than the first search phase. This means search results in a first search phase may be included a secondary search phase. Alternatively, different rules may be associated with each search phase, such that each search phase has a different, non-intersecting set of search results from the prior search phase(s).

Once the number of search phases to execute is determined along with the specific constraints to be used in every search query associated to a search phase, the search engine executes the queries of the different search phases in parallel on select systems and/or sources. The search results for the different search phases are presented to a user in a manner that minimizes confusion to the user. In one embodiment, once the first search phase completes, the first search results are presented to the user as shown in FIG. 1B. If one or more secondary search phases executes and at least one secondary search phase completes the user is presented with a summary for results of the secondary search phase, and given an option to view the search results for that phase. Different types of indicators or presentation formats can be used to make the user aware of the different search phase results and their content.

Travel Reservation Search Engine

Figure 3:
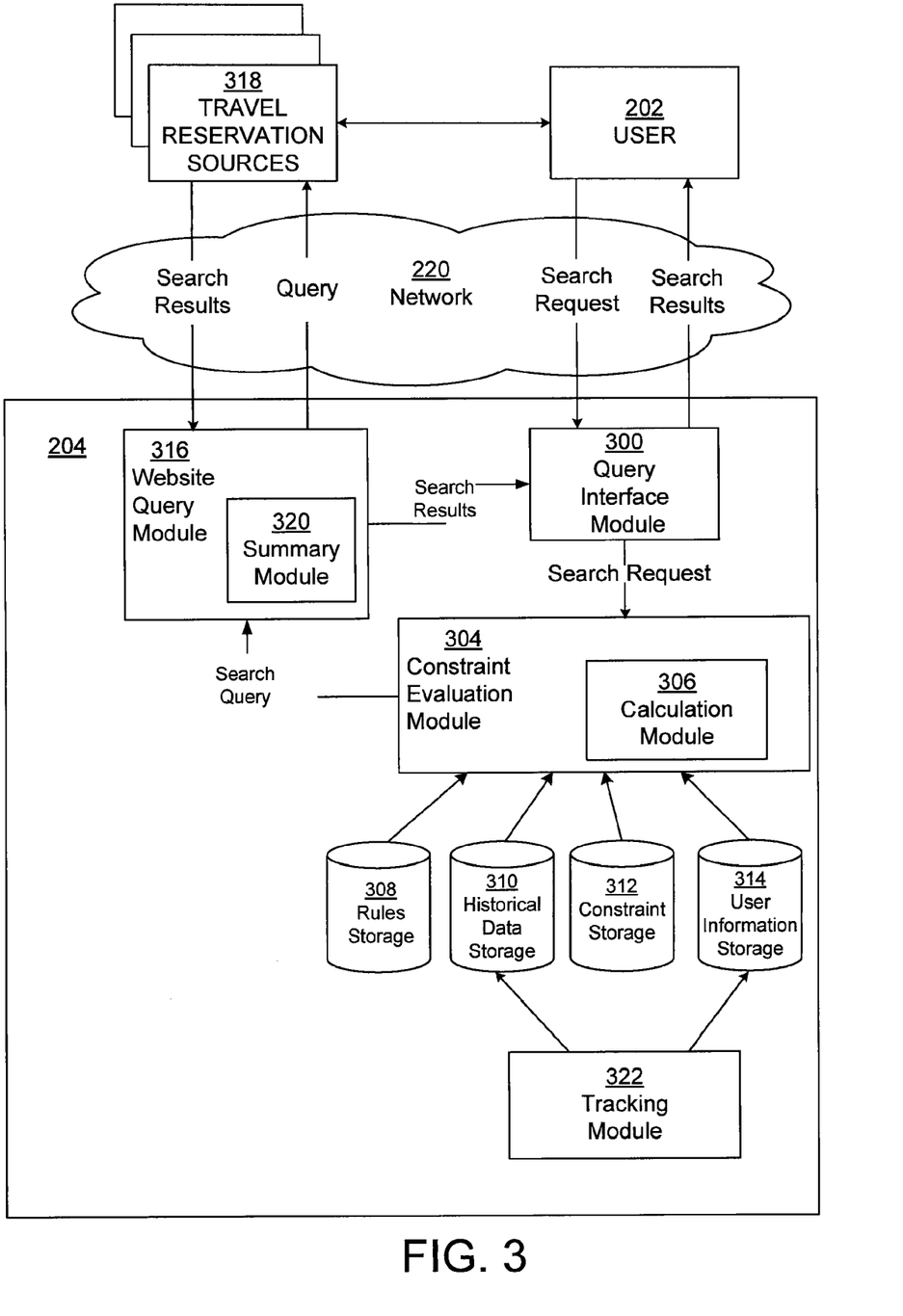
FIG. 3 is a high-level block diagram of the software architecture of the travel reservation search engine.

FIG. 3 is a high-level block diagram of the software architecture of the travel reservation search engine. Those of skill in the art will recognize that other embodiments can have different and/or other modules than the ones described here, and that the functionalities can be distributed among the modules in a different manner.

As shown in FIG. 3, the search engine 204 includes a query interface module 300 that allows the search engine 204 to communicate with a user via the network 220. In one embodiment the user uses a conventional browser, such as MICROSOFT INTERNET EXPLORER or MOZILLA FIREFOX, to submit search requests and view webpages transmitted by the query interface module 300. In one embodiment, the browser maintains a cookie cache that stores cookies associated with websites on the network 220. The query interface module 300 can communicate with the browser and instruct it to create a cookie in the cookie cache holding certain information. The query interface module 300 receives the user's input travel information search request, such as a flight information request, an accommodation information request, a car rental request, or the like. The request is received, for example, via a web page form. The query interface module 300 passes the various attributes or variables from the request to the constraint evaluation module 304.

The constraint evaluation module 304 receives the search request from the query interface module 300, and determines the specific constraints to be used in a search query for a first search phase and if necessary the constraints to be used in a search query for each of the secondary search phases, each search query is based on constraints derived from a user's initial travel search request. The specific search query for one or more search phases is determined by evaluating the attributes of the search request from the user using rules in a rules storage 308. Each rule includes an antecedent and a consequent. The antecedent comprises one or more attributes of data derived from the user's search request, such as departing airport, arrival airport, airline, number of stops, and so forth. The consequent of each rule is a constraint that can be included in a search query to satisfy the user's search request. The constraints may be the same as or different from the original travel search request from the user. As further described later on, the rules stored in the rules storage 308 are determined by a calculation module 306 within the constraint evaluation module 304, which determines the rules from analysis of historical data captured by a tracking module 322.

Upon finding a match for antecedent attributes of the search request from the user in a table in the rules storage 308, the constraint evaluation module 304 is able to find specific applicable rules based on their associated scores. Each rule, as a consequent has information regarding a constraint that can be added to a search query for a first search phase or possibly to a search query for one or more secondary search phases. The constraint evaluation module 304 is setup to choose one or more of the applicable rules and their associated constraints to add to a search query for a first search phase. Additionally, one or more rules and their associated constraints can be added to one or more secondary search phases. In one embodiment, the rules used in a search query for the first search phase have a combined minimum specified score. Any remaining applicable rules may be used by constraint evaluation module 304 to add as constraints to a search query for one or more secondary search phases. In one embodiment, each individual applicable rule to a search request from a user is used is in a search query for a search phase, meaning that the number of rules and the number of search phases executed is equal. In one embodiment, only a first search phase is executed if the number of rules necessary to result in the target probability of a purchase will result in an overly narrow set of results. In one embodiment, the first search phase is the only search phase executed and it executes with only the constraints provided by the user's search request. The reason for that could be because no rules with additional constraints are associated with the search request or the rules that exist may not be considered adequate to associate with a first search phase.

An example of the way the constraint evaluation module 304 determines the constraints to include in a search query for a first search phase and if necessary, the constraints to include in a search query for one or more search phases is given below. The example below involves a flight search request from a user, it should be understood that the present invention is not limited to flight searches. A flight search is used as an example for ease of understanding the functions performed by the constraint evaluation module 304. For example, assume that the constraint evaluation module 304 receives a search request for flights from Boston to San Francisco on a specific date. The constraint evaluation module 304 searches the rules storage for one or more rules regarding flights from Boston (BOS) to San Francisco (SFO). The attributes of the search request that matches against the rule antecedents are that the departing airport is BOS and the arrival airport is SFO. The rules that the constraint evaluation module 304 finds with these antecedents are the following:

Rule 1: Stop: Nonstop = .47
Rule 2: Stop: Chicago = .20
Rule 3: Stop: Denver = .10
Rule 4: Stop: Atlanta = .08

In one embodiment, if no rules are found that match attributes of the search request with the antecedents of the rules, the search request is not executed in multiple phases. Instead the search request is executed in a conventional manner, as a one search phase for any flights from BOS to SFO on a specific day. In this example, each rule has consequent constraint of a possible layover city. The score for a query here this example is set equal to the cumulative probability that a user will be interested in purchasing a flight from BOS to SFO with a specific city as a layover or possibly no layover at all. The score could have been determined based on a plurality of factors such as the probability and the average amount of time it takes to complete a search query with a specific constraint. The probabilities were determined based on the layover users in the past have had in purchased flights from BOS to SFO. Which means that based on Rule 1, 47% of users that purchased a flight from BOS to SFO purchased a nonstop flight.

The cumulative probability that a user will be interested in purchasing a flight with a specific layover could be different if additional attributes were matched to rule antecedents, such as the day of travel, the duration of travel, the number of passengers, type of passenger, class of service, how far in advanced the search request is made before day of travel, etc. For example, the probability that a user may purchase a nonstop may be relatively greater if the day of travel is on a weekday because it is a business trip or the user may have a higher probability of be interested in flying nonstop if the trip is a short trip. The probability of a user flying nonstop may also be greater if the passenger is a senior citizen or an adult with multiple children. Other attributes that can be used in determining the probability of search results leading to a purchase could be the operating environment of the user and how quickly a user uses the search engine to enter a query, or the number of queries the user makes per session. For example a user with a new computer and/or browser that uses the search engine in quick manner may be a power user, which means they are more likely a frequent traveler who more than likely always fly non-stop.

In this example the constraint evaluation module 304 is set to include the constraints associated to one or more of top applicable rules until the combined score is equal to or great than 0.70. The selected rules are used in the search query for the first search phase; any rules not included in the search query for the first search phase are included in a search query for a second search phase. By the constraint evaluation module 304 choosing rules with a combined score of at least 0.70 represents that the search results for a query based on these rules have an estimated 70% chance of having flights that user will purchase, and the second search phase is targeting search results with less than a 30% chance of having flights that user is interested in purchasing. The targeting percentage for each search phase could be set by the system operator as desired.

In one embodiment, the search query for the second search phase is set by the system operator to be more thorough than the first search phase. For example, the system operator can set the second search phase for targeting search results with greater than a 70% chance of having flights that user is interested in purchasing. In this example, a more thorough search query for the second search phase may only include the constraints from the user's search request of any flight from BOS to SFO on a specific day, which would have close to a 100% chance of returning results the user is interested in purchasing.

Since the search query for the first search phase is to include top applicable rules with a combined score of at least 0.70, it means that the search query for the first search phase would be for flights from BOS to SFO that are nonstop or have a layover in Chicago or have a layover in Denver. Note that the probabilities here are disjoint, since each of the layover operations are mutually exclusive. In other words, the first query is a form as a disjunction of the first three constraints. The search query for the second search phase would be for flights from BOS to SFO with a layover in Atlanta. It should be understood that the layover cities are not the only constraints used for the rules; an additional constraint that could be used for rules could be different nearby airports or any other constraints that aren't accounted for in determining the score. Additionally, a rule can have more than one constraint associated to the rule. Further, in order to avoid results sets that are too narrowly constrained, the rules for the first search phase can be selected to have a total score less than a maximum amount (i.e., less than a maximum probability).

A website query module 316 transmits search queries received from the constraint evaluation module 304 to the travel reservation sources 318 and additionally receives the search results for the respective search requests from the travel reservation sources 318 via the network 220. The travel reservation sources 318 represent one or more of the systems in FIG. 2. Based on the search queries received from the constraint evaluation module 304, the website query module 316 is able to identify which of the travel reservation sources 318 to send specific search queries to for execution. In one embodiment, the website query module 316 identifies the travel reservation sources 318 to transmit a query search to, based on the one or more constraints within query search. In one embodiment, all of the different search queries are sent by the website query module and executed by the specific travel reservation sources 318 in parallel. Once a travel reservation source 318 finishes executing a query search, the travel reservation source transmits the search results for the query search to the website query module 316.

When the website query module 316 receives search results for a query search from a travel reservation source 318, the website query module identifies the search phase associated with the results and waits to receive the search results from all of the other travel reservation sources 318 for the specific search phase. Once all of the search results for a specific search phase are received, if the search results are the search results for the first search phase, the search results are sent to query interface module 300. The query interface module 300 transmits the results to the user. In one embodiment, the query interface module 300 may rank the search results in a specific order and/or format the search results before transmitting them to the user.

On the other hand if the search results received for a specific search query are associated to a secondary search phase, a summary module 320, which is part of the website query module 316, determines the summary to associate with the search results of the secondary search phase. In one embodiment, prior to determining the summary of a secondary search phase, the website query module 316 may choose to remove specific travel information received from a travel reservation source 318 as part of the search results for the secondary search phase. For example, travel information for a travel reservation that is more expensive than those in the first search phase may not be included as part of a secondary search phase. In one embodiment, the website query module 316 removes duplicate results from the search results of a secondary search phase.

In one embodiment, the summary module 320 determines the summary for search results of a secondary search phase by analyzing the information of the search results for one or more specific characteristics. In another embodiment, each rule has an associated summary text stored in the rules storage 308. The summary module 320 reads the summary text stored in the rules storage 308 for each rule associated with a specific secondary search phase and the collection of the one or more summaries is used as the summary for the search results of the specific secondary search phase. The purpose of the determined summary for search results is to inform the user of the uniqueness of each secondary search phase and/or provides comparison information between different search phases executed.

The summary determined by the summary module 320 for the search results of a secondary search phase is immediately transmitted to the query interface module 300 in order for the summary to be presented to the user along with a link to view the search results of the search phase associated with the summary. An example of search information is the amount of money that a specific set of search results associated to the summary can save a user when compared to the search results that the user is viewing. Another example of a summary could be the specific constraints contained by the search query that produced the search results, such as that flight search results of a search phase are for nonstop flights.

In one embodiment, the summary module 320 determines the summary for search results of a secondary search phase based on how the user selects to sort the search results and/or based on how the user has sorted search results in the past. For example, if the user has sorted by price in the first search phase, the summary module 320 may summarize the secondary search results in terms of price (e.g. "Additional flights available—save $100"). If the user has sorted search results for flights based on airlines in a previous search, the system may summarize secondary search results based on the specific airlines contained in the secondary search results. In one embodiment, whenever the user changes the sorting of search results the summary module 320 determines a new summary for the secondary search.

In one embodiment, if a user's search request is going to be executed in multiple phases the summary module 320 transmits a summary to the query interface module 300 to help make clear to the user that their search request is being executed in multiple search phases. The summary helps to avoid the user becoming confused. Any type of visual highlighting (e.g. different colors, boxes, a message, etc) can be used to help the user understand that their search request is being executed in multiple phases.

As mentioned above, the tracking module 322 builds the information stored in the historical data storage 310 and a user information storage 314. Every time search results for a specific search phase are transmitted to the user, the tracking module 322 stores the information of the search query that produced the search results in the historical data storage 310; each search query is associated with a unique search identifier. The information associated to a search query that is stored in the historical data 310 includes information on the constraints of the search query, the amount of time it took to receive search results from specific travel reservation sources 318, the total time it took to receive results from all travel reservation sources 318, original search request from the user, and whether the results were successful. The tracking module 322 is able to determine if search results for a search phase were successful by determining that the search results resulted in the purchase of a travel reservation and/or by determining if the search results were viewed in detail.

In one embodiment the tracking module 322 determines that a travel reservation was made because the payment for the travel reservation is made by a user through the search engine 204. In another embodiment, if a travel reservation is purchased through a travel reservation source 318, the search engine links the user to the travel reservation source 318. When the user leaves the search engine 204 to make a purchase, the travel reservation source 318 receives an identification number associated with the user's search request (e.g., the search ID) and/or an identification number associated with the search query for the specific search phase that produced the results where the user found the travel reservation information. If the user makes the purchase the travel reservation source 318 provides the information to the tracking module 322 along with the one or more identification numbers provided to the travel reservation source 318. The purchase information is stored in the historical data storage 318 along with the information of its respective search phase. Alternatively, if the tracking module 322 is not able to verify a purchase of a travel reservation, the tracking module 322 determines if search results were successful by tracking the amount of selections that are made on the search results. For example, if the user clicks on a specific travel reservation in the search results to get more details on the travel reservation, the tracking module 322 can deem the search results to be a success. Additionally, the tracking module 322 stores information in the user information storage 314 of queries and travel reservations that a user has made in the past.

As described above, the calculation module 306 determines the rules to be included in the rules storage 308, by using constraint storage 312 to analyze the historical data storage 310. The constraint storage 312 contains antecedent attributes and consequent constraints for a specific reservation type. As described previously, antecedent attributes are attributes that the user can include in their search request submitted to the query interface module 300, such as departing airport and arrival airport. Consequent constraints are constraints that can be included in a search query sent to a travel reservation source. The consequent constraint can include constraints that are not visible to the user when submitting a search request to the search engine 204, such as circularity of route, cost factors, and other variables.

Periodically, the calculation module 306 reads the antecedent attributes for a specific type of travel reservation (e.g. flight reservation) stored in the calculation module 306 and analyzes the data stored in the historical data for past search queries executed on travel reservation sources 318 with the same antecedent attributes that were successful in terms of producing a purchase or that the user looked at the results in detail. For example, if the antecedent attributes are departing airport and destination airport the calculation module 306 may find all successful search queries with attributes of flights from Boston (BOS) to San Francisco (SFO). Based on the past queries found by the calculation module 306 with the antecedent attributes, the calculation module 306 reads an associated consequent constraint from the constraint storage 312 and determines what percentage of these queries contained the specific constraint. The percentage found is as an estimate of the probability that the constraint in a query request with the specific antecedent attributes will be successful.

For example, again consider the antecedent attributes for a flight search of departing airport and arriving airport. The calculation module 306 finds all successful queries stored in the historical data storage 310 for two of the possible antecedent attributes such as the departing airport being Boston (BOS) and arrival airport being San Francisco (SFO) for some period of time, say one month. Assume the calculation module 306 finds 5,000 successful queries with those attributes. The calculation module 306 reads an associated attributes of the purchased flights, such as nonstop flights, layover cities, departure times, and so forth. The calculation module tabulates the 5,000 queries and determines the highest percentage of those successful queries that were nonstop flights. Assume, that the calculation module 306 determines that 2,358 of the successful queries included the constraint of being nonstop, which is equal to 47% of all the purchased flights from BOS to SFO. The percentage can be used as an estimate of the probability that the constraints of non-stop flights for a BOS to SFO flight will return a result that the user will purchase. In one embodiment, the calculated probability of a specific constraint included in a search query producing successful search results is used as the score of the constraint.

In another embodiment, the probability of a specific constraint included in a search query producing successful search results is one factor among a plurality of factors associated with each constraint. Additional factors, as further described below, include a time factor, a cost factor, and a result complexity factor. Where each constraint includes a number of factors, then the calculation module calculates a score for a set of constraints as the sum of the linear combination of the factors for each constraint in the set.

One additional factor that can be used in determining the score for a constraint of a query request is a time factor, representing an amount of time it takes to complete the query based on the constraint. The calculation module 306 can calculate an average amount of time it takes to complete a query with a specific constraint by analyzing historical data of the amount of time it took previous queries with the same constraint to complete. Alternatively, the calculation module 306 can have a search query with the specific constraint executed a number of times (e.g., 100 executions) in order to accumulate statistical data on the average time it takes to complete the search query. The average amount it takes a query with the constraint to execute is a factor used in determining the score of the constraint. In one embodiment, the calculation module 306 sets a maximum time by which all search queries in the first search phase should execute. In one embodiment, the score of a constraint is based on whether search query with the constraint executes below the maximum time.

An additional factor that may be used in determining the score of a constraint is a monetary cost to the system operator for executing a search query with the constraint. The calculation module 306 can estimate the cost of executing the search query by determining what travel reservation sources 318 will receive the search query and the cost each travel reservation source 318 charges for executing the search query. In addition, the calculation module 318 can implement budgeting, where the funds available by the search engine are limited over some time period (e.g. day, week, month, etc.), and select rules based on a tradeoff of available budget and the probability of a successful result. For example, the calculation module will make sure the constraint receives a low score if it is determined the search query will be expensive and the search engine has exceeded (or will exceed) its budget, or will reduce its available budget by more than a specified percentage.

Another useful factor in calculating a score is result complexity factor, which is a measure of the degree to which the search results can be presented to the customer in a simple understandable manner. One way to represent the result complexity factor is the total number of constraints to be applied in search query. Thus, a search query comprising a single additional constraint (e.g., non-stop flights), is easier for a user to understand than a search query comprising three disjoint constraints (e.g., non-stop or Chicago layover or departure between 8 am and 10 am). In other words, the calculation module 306 can attempt to select the minimum number of constraints to reach the target probability.

The purpose of the calculation module 306 using one or more factors in determining a score for a constraint (or set of constraints) is so that the constraints receive scores based on what is the desired performance characteristics of the search engine 204. For example, if the search engine 204 is intended to execute search queries that execute quickly, are low in cost, and provide results with a high probability then a constraint (or set of constraints) with those qualities will receive a high score.

Accordingly, in a simple embodiment using just the probability factors, each rule in the rules storage 308 can take the logical form of:

<attribute_list, constraint, probability factor, summary_text> where the attribute_list is one or more attributes of data derived from the user's search request, which the constraint evaluation module 304 uses to find applicable rules for the user's search request. The constraint in the rule is the constraint that would be added to a search query for a search phase if chosen by the constraint evaluation module 304. The probability factor is used by the constraint evaluation module as an additive contribution to net score if the constraint should be included in the search query of a search phase, as in the example discussed above. The summary_text portion of the rule contains information as to the constraint associated by the rule and additionally information that should be displayed to a user if the rule is part of a secondary search. In one embodiment, the summary module 320 reads the summary_text portion of the rule when determining a summary for a secondary search. In one embodiment, the calculation module 306 calculates the probability for a constraint and updates the appropriate rules to store in the rules storage 308 for a set of attributes periodically (e.g., monthly, weekly, daily, etc.).

In a more complex embodiment using multiple factors in each rule, each rule in the rules storage 308 can take the logical form of:

<attribute_list, constraint, probability factor, time factor, cost factor, complexity factor, summary_text> where the time factor, cost factor, and complexity factor are as described above. In this embodiment, the score for a candidate rule R under consideration is:

Score=$w_1P+w_2T+w_3C+w_4X$ where
P is the is probability factor for candidate rule R;
T is the time factor for candidate rule R;
C is the cost factor for candidate rule R;
X is the result complexity factor for candidate rule R; and
$w_1$ through $w_4$ are weights on the above factors.

The calculation module 306 is configured to select a candidate rule R as a rule for inclusion in rule storage 308 based upon the score for the candidate rule. In one embodiment, the calculation module 306 is configured to create a rule in response to the score being above a threshold amount for the combined score set by the system administrator. This rule creation threshold will generally be less than the threshold used during processing by the constraint evaluation module 304, since at that stage, multiple rules can be combined to meet the target threshold. Thus, the threshold amount for the score may still may be used as establishing a target result probability, since the score is still based on (e.g., a function of) the probability factor, in addition to other factors.

When multiple factors in addition to the probability factor are used, the minimum target threshold used by the constraint evaluation module 304 is adjusted to accommodate the additional factors in the scoring. The scores for the one or more rules under evaluation are then summed and compared with the minimum target threshold. For example, when selecting constraints for constructing a search query, the constraint evaluation module 304 scores the individual constraints, using the multiple factor scoring, and orders the constraints according to their scores, and then iteratively adds each constraint (from highest to lowest) to get a total score:

$$Score = \sum_{i=1}^{n} w_1 P_i + w_2 T_i + w_3 C_i + w_4 X_i$$

where n is the accumulated number of constraints being considered.

In one embodiment, when the query interface module 300 receives a search request from a user, the rules stored in the rules storage 308 have been previously determined, but the constraint evaluation module 304 can also use the user's personal history for choosing rules to incorporate into a search phase. For example if a user has historically purchased flights from Boston to San Francisco with a layover in Atlanta, the constraint module 304 can increase the weight given to the probability factor for the constraint of a layover in Atlanta. The information of the user that submitted the search request is stored in the user information storage 314.

Method of Operation

Figure 4:
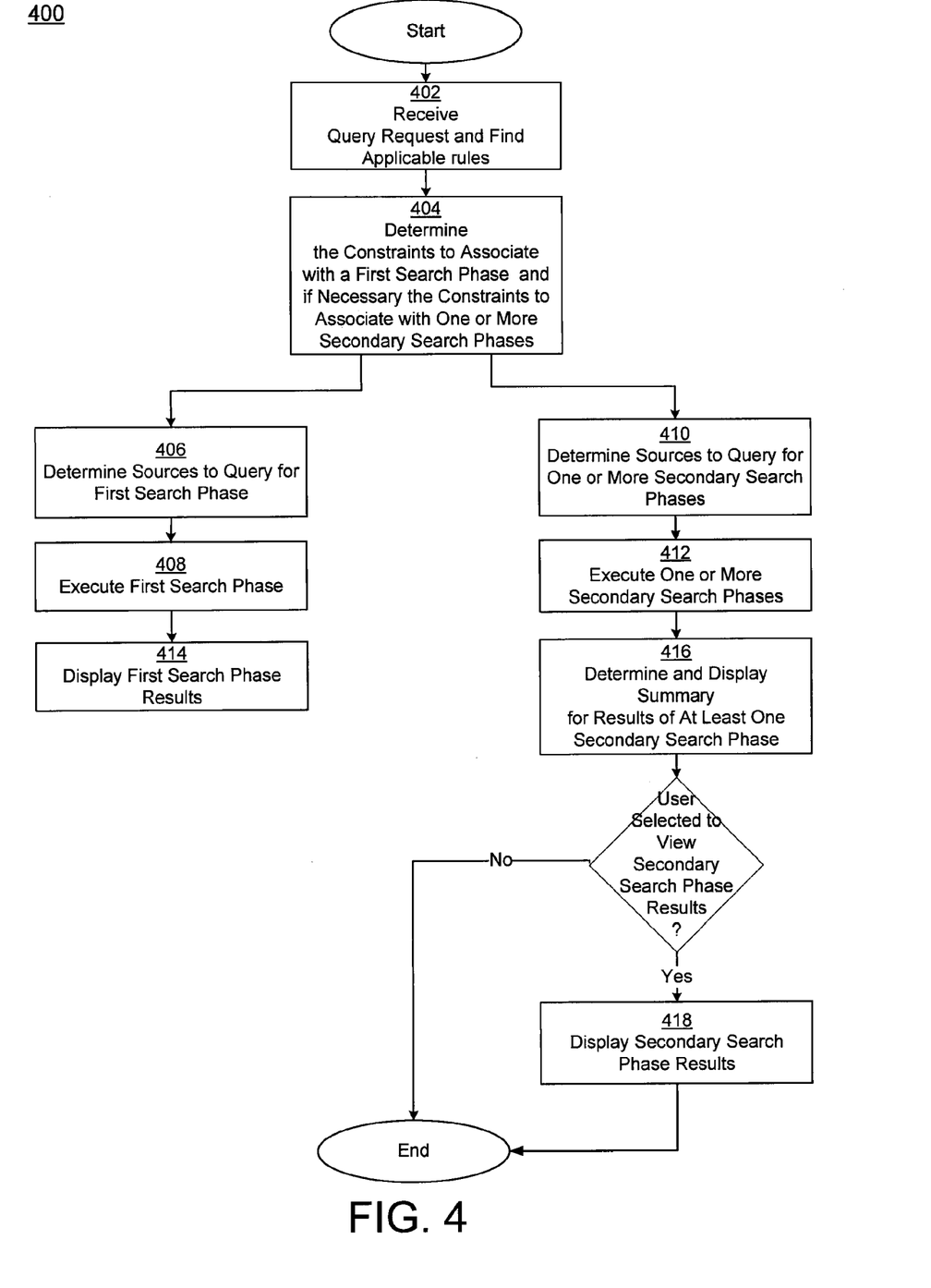
FIG. 4 is a flow chart illustrating a multi-phase search for a travel reservation.

FIG. 4 is a flow chart illustrating a method for multi-phase search for a travel reservation. Those of skill in the art will recognize that other embodiments can perform the steps of FIG. 4 in different orders. Moreover, other embodiments can include different and/or additional steps than the ones described here.

FIG. 4 illustrates steps performed by the search engine 204 to satisfy a search request received from a user. Assume for purposes of this example that the user uses a web browser to enter travel reservation search information on a webpage of the search engine and the user selects the option to submit the search information to the search engine 204.

The search engine 204 receives 402 from the user a search request that includes all of the search information entered by the user and based on the search information the search engine finds applicable rules stored in the rules storage 308. The search engine 204 uses the applicable rules to determine 404 the constraints to associate with a first search phase and if necessary the rules to associate with one or more secondary search phases. The search engine 204 includes the constraints of one or more higher ranked rules with a combined score equal to a minimum threshold amount in the first search phase. In one embodiment, if no rules are applicable to the search request or if the rules applicable are determined to be inadequate based on their score, then the first search phase includes only the constraints of the search request entered by the user. If the search engine determines that one or more secondary search phases are necessary, then rules are included in one or more secondary search phases. In one embodiment, the rules are determined based on a score that takes into account the probability that a constraint of a search phase will produce search results that will lead to a purchase by the user, the amount of time it takes to receive search results for a search phase request, and other factors.

Based on the determined constraints for the first search phase the search engine 204 determines 406 the travel reservation sources 318 to query. The first search phase is executed 408 at all of the sources identified. In parallel to the first search phase, the search engine 204 determines 410 the travel reservation sources 318 to query for the second search phase. The one or more secondary search phases are executed 412 at all of the sources identified.

Responsive to receiving search results for the first search phase from all of the travel reservation sources 318 queried, the search engine 204 displays 414 the first search phase results to the user. In one embodiment, before displaying the search results to the user, the search results are formatted and/or arranged in a specific order. Once at least one secondary search phase is complete and all of the search results are received from the travel reservation sources 318, the search engine 204 determines 416 and displays a summary for each of the secondary search phase results to the user. In one embodiment, the summary of each of the secondary search phase results is displayed to the user along with the first search phase results. In one embodiment, the summary for each secondary search phase results is generated by scanning the search results for specific characteristics, such as the price difference between specific secondary search results and first search phase results. In another embodiment, the summary for each secondary search phase results is generated by reading summary data stored in the rules storage 308 for rules associated to a specific secondary search phase.

Along with the summary of each secondary search phase results, a link is provided for each secondary search phase, which allows the user to view each of the secondary search phase results. If the user selects to view specific secondary search phase results, the search results are displayed 418 to the user. In one embodiment, secondary search phase results are displayed along with the first search phase results. Alternatively, the secondary search phase results are displayed instead of the first search phase results. If the user does not select to view the secondary search phase results, the secondary search phase results are never displayed to the user.

The present invention has been described in particular detail with respect to various possible embodiments, and those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present invention is not described with reference to any particular programming language. It is appreciated that a variety of programming languages may be used to implement the teachings of the present invention as described herein, and any references to specific languages are provided for disclosure of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

The invention claimed is:

1. A computer program product comprising at least one non-transitory computer-readable storage medium storing computer-executable code for a travel reservation search engine to execute search requests, the computer-executable code comprising:
   a query interface module configured to receive from a user a search request for travel reservation information, the search request including at least one first constraint to be met by results returned by a search;
   a constraint evaluation module configured to:
      select at least one additional constraint not included in the search request;
      construct a first query based on the at least one first constraint and the at least one additional constraint such that fewer search results are obtained in response to executing the first query than would be obtained in response to executing a query constructed without the at least one additional constraint; and
      construct a second query based on the at least one first search constraint without the at least one additional constraint;
      wherein the select at least one additional constraint is performed based on an estimated execution time of the first query with the at least one additional constraint; and
   a website query module configured to execute the first query to obtain first phase query results and the second query to obtain second phase query results, wherein the first phase query results and the second phase query results are non-intersecting.

2. The computer program product of claim 1, wherein the query interface module is further configured to present a visual indicator indicating that the search request is being executed in multiple phases.

3. The computer program product of claim 1, wherein the constraint evaluation module is further configured to construct the second query to have a higher probability than the first query of returning a successful search result.

4. The computer program product of claim 1, wherein the web site query module is further configured to determine one or more travel reservation information sources to execute the first query and the second query.

5. The of claim 1, wherein the at least one additional constraint is selected to achieve a minimum threshold probability that the first query will return a successful result, and wherein the first query is constructed to have a probability of returning a successful search result that satisfies the minimum threshold probability, the probability determined based on one or more queries previously executed that included the at least one additional constraint.

6. The computer program product of claim 1, wherein the at least one additional constraint is selected to achieve a minimum threshold probability that the first query will return a successful result, and wherein the constraint evaluation module in constructing the first query is further configured to:
   identify rules based on the search request, a constraint and probability associated with each rule;
   select from the identified rules, one or more rules whose summed probabilities satisfies the minimum threshold probability; and
   construct the first query to include the constraints of the selected rules.

7. The computer program product of claim 6, wherein the constraints of the unselected rules are included in the second query executed to obtain the second phase query results.

8. The computer program product of claim 1, wherein the first phase query results are a subset of the second phase query results.

9. The computer program product of claim 1, wherein the website query module is configured to execute the first query on a first travel reservation information source and to execute the second query on the first travel reservation information source.

10. A computer system for executing search requests, the computer system comprising:
   at least one computer processor; and
   a computer-readable storage medium storing computer program modules executed by the at least one computer processor, the computer program modules comprising:
   a query interface module configured to receive from a user a search request for travel reservation information, the search request including at least one first constraint to be met by results returned by a search;
   a constraint evaluation module configured to:
      select at least one additional constraint not included in the search request to construct a first query based on the at least one first constraint and the at least one additional constraint such that fewer search results are obtained in response to executing the first query than would be obtained in response to executing a query constructed without the at least one additional constraint; and
      construct a second query based on the at least one first search constraint without the at least one additional constraint;
      wherein the select at least one additional constraint is performed based on an estimated execution time of the first query with the at least one additional constraint; and
   a website query module configured to execute the first query to first phase query results and the second query to obtain second phase query results, wherein the first phase query results and the second phase query results are non-intersecting.

11. The computer system of claim 10, wherein the at least one additional constraint is selected to achieve a minimum threshold probability that the first query will return a successful result, and wherein the first query is constructed to have a probability of returning a successful search results that satisfies the minimum threshold, the probability determined based on one or more queries previously executed that included the at least one additional constraint.

12. The computer system of claim 10, wherein the first phase query results are a subset of the second phase query results.

13. The computer system of claim 10, wherein the website query module is configured to execute the first query on a first travel reservation information source and to execute the second query on the first travel reservation information source.

14. A computer-implemented method for executing search requests, the method comprising:
receiving from a user a search request for travel reservation information, the search request including at least one first constraint to be met by results returned by a search;
selecting at least one additional constraint not included in the search request;
constructing a first query based on the at least one first constraint and the at least one additional constraint such that fewer search results are obtained in response to executing the first query than would be obtained in response to executing a query constructed without the at least one additional constraint;
constructing a second query based on the at least one first search constraint without the at least one additional constraint;
wherein the select at least one additional constraint is performed based on an estimated execution time of the first query with the at least one additional constraint; and
executing the first query to obtain first phase query results and the second query to obtain second phase query results, wherein the first phase query results and the second phase query results are non-intersecting.

15. The computer-implemented method of claim 14, wherein the search request is for a flight reservation.

16. The computer-implemented method of claim 14, wherein the search request is for an accommodation reservation.

17. The computer-implemented method of claim 14, wherein selecting the at least one additional constraint is performed based on an estimated execution cost of the first query with the at least one additional constraint.

18. The computer-implemented method of claim 14, wherein selecting the at least one additional constraint is performed based on a factor representing a complexity of a presentation of search query results for the first query with the at least one additional constraint.

19. The computer-implemented method of claim 14, further comprising presenting the first phase query results to the user.

20. The computer-implemented method of claim 14, wherein the at least one additional constraint is selected to achieve a minimum threshold probability that the first query will return a successful search result, and wherein a search result is deemed successful responsive to the user making a purchase based on the search result.

21. The computer-implemented method of claim 14, wherein the at least one additional constraint is selected to achieve a minimum threshold probability that the first query will return a successful search result, and wherein a search result is deemed successful responsive to the user reviewing the search result.

22. The computer-implemented method of claim 14, wherein the at least one additional constraint is selected to achieve a minimum threshold probability that the first query will return a successful search result, and wherein a search result is deemed successful responsive to the user making a reservation based on the search result.

23. The computer-implemented method of claim 14, wherein the at least one additional constraint is selected to achieve a minimum threshold probability that the first query will return a successful search result, and wherein a search result is deemed successful responsive to the user making an inquiry of a travel vendor based on the search result.

24. The computer-implemented method of claim 14, further comprising presenting to the user a summary of the second phase query results without presenting the second phase query results.

25. The computer-implemented method of claim 24, wherein the summary describes a characteristic of the second phase query results.

26. The computer-implemented method of claim 24, wherein the summary is determined based on a sort order of the first phase query results.

27. The computer-implemented method of claim 14, further comprising presenting the second phase query results to the user responsive to the user requesting to view the second phase query results.

28. The computer-implemented method of claim 14, further comprising presenting the second phase query results in conjunction with the first phase query results.

29. The computer-implemented method of claim 14, further comprising presenting the second phase query results independently of the first phase query results.

30. The computer-implemented method of claim 14, wherein the at least one additional constraint is selected to achieve a minimum threshold probability that the first query will return a successful result, and wherein the first query is constructed to have a probability of returning a successful search results that satisfies the minimum threshold, the probability determined based on one or more queries previously executed that included the at least one additional constraint.

31. The computer-implemented method of claim 14, wherein the first phase query results are a subset of the second phase query results.

32. The computer-implemented method of claim 14, wherein the executing comprises executing the first query on a first travel reservation information source and executing the second query on the first travel reservation information source.

33. A computer-implemented method for executing search requests, the method comprising:
receiving from a user device a search request for a travel reservation, the search request including at least one first constraint to be met by results returned by a search;
constructing a first query and a second query for the travel reservation based on the search request, the first query constructed based on the at least one first constraint and at least one additional constraint not included in the search request such that the first query returns a subset of results that would be obtained by a query based on the search request without the at least one additional constraint, and the second query constructed based on at least one constraint not included in the first query;

wherein the select at least one additional constraint is performed based on an estimated execution time of the first query with the at least one additional constraint;

executing the first query to obtain first phase query results and the second query to obtain second phase query results, wherein the first phase query results and the second phase query results are non-intersecting;

transmitting to the user device for presentation, the first phase query results; and transmitting to the user device for presentation, a summary indicating that the second phase query results are available for presentation.

34. The method of claim 33, wherein the first query is constructed for obtaining the first phase query results faster than the second phase query results of the second query.

35. The method of claim 33, wherein executing the first query comprises transmitting the first query to a plurality of information sources to receive search results from the plurality of information sources.

* * * * *

UNITED STATES PATENT AND TRADEMARK OFFICE
CERTIFICATE OF CORRECTION

PATENT NO.        : 8,972,434 B2
APPLICATION NO.   : 11/951098
DATED             : March 3, 2015
INVENTOR(S)       : Paul M. English et al.

It is certified that error appears in the above-identified patent and that said Letters Patent is hereby corrected as shown below:

In the Claims

At column 20, claim 5, line 7, please change: "The of claim 1, wherein the at least one additional" to -- The computer program product of claim 1, wherein the at least one additional --; and At column 20, claim 10, line 67, please change: "query to first phase query results and the second query to" to -- query to obtain first phase query results and the second query to --.

Signed and Sealed this
Seventh Day of July, 2015

Michelle K. Lee
*Director of the United States Patent and Trademark Office*